United States Patent [19]

Maki

[11] Patent Number: 4,812,537

[45] Date of Patent: Mar. 14, 1989

[54] COATING COMPOSITION FOR METALS

[75] Inventor: Tetsu Maki, Hiratsuka, Japan

[73] Assignee: Kansai Paint Co., Ltd., Amagasaki, Japan

[21] Appl. No.: 51,694

[22] Filed: May 20, 1987

[30] Foreign Application Priority Data

May 22, 1986 [JP] Japan .................. 61-118041

[51] Int. Cl.$^4$ .............. C08L 63/02; C08G 59/06; C08G 59/14
[52] U.S. Cl. ................... 525/488; 525/481; 525/510; 525/514; 525/516
[58] Field of Search ............ 525/488, 510, 514, 516, 525/533

[56] References Cited

U.S. PATENT DOCUMENTS

| | | | |
|---|---|---|---|
| 2,907,726 | 10/1959 | Greenlee | 525/488 |
| 2,907,730 | 10/1959 | Greenlee | 525/488 |
| 2,907,731 | 10/1959 | Greenlee | 525/488 |
| 3,985,695 | 10/1976 | Tobias et al. | 523/402 |
| 4,151,305 | 4/1979 | Davis et al. | 525/510 |
| 4,296,005 | 10/1981 | Di Benedetto | 525/514 |
| 4,302,373 | 11/1981 | Steinmetz | 525/533 |
| 4,362,853 | 12/1982 | Demmer | 525/533 |
| 4,467,070 | 8/1984 | Kordomenos et al. | 525/510 |
| 4,485,199 | 11/1984 | Kondomenos et al. | 525/510 |
| 4,497,938 | 2/1985 | Kordomenos | 525/514 |

FOREIGN PATENT DOCUMENTS

| | | | |
|---|---|---|---|
| 1248199 | 8/1967 | Fed. Rep. of Germany | 525/488 |
| 59-15458 | 1/1984 | Japan | 525/488 |

Primary Examiner—John C. Bleutge
Assistant Examiner—Robert E. L. Sellers, II
Attorney, Agent, or Firm—Fisher, Christen & Sabol

[57] ABSTRACT

Disclosed is a coating composition for metals containing (A) a modified bisphenol type epoxy resin and (b) a phenol resin and/or an amino resin, which composition has excellent properties in fabricating properties, corrosion resistance, etc. and is suitably applicable to both inner and outer surfaces of the vessels for use in food and drink.

11 Claims, No Drawings

COATING COMPOSITION FOR METALS

BACKGROUND OF THE INVENTION (1) Field of the Invention

This invention relates to a coating composition for metals, more particularly to a coating composition having excellent properties in fabricating properties, corrosion resistance, etc. and containing a specified, modified epoxy resin and a phenol resin and/or an amino resin.

(2) Description of the Prior Art

A so-called precoat metal plate, which is prepared by coating a coating composition onto a metal plate as a substrate material directly or after subjecting the metal plate to a pretreatment or a chemical treatment followed by curing, has been widely used in practice in the art. The precoat metal plate is properly shaped and processed to be employed for various uses as a coated and fabricated metal product. However, the aforementioned precoat metal plate raises such problems that a coated film of such a fabricated metal product has a certain limit on fabricating properties particularly those in bending and shaping, so that a severe deformation of the fabricated metal product on fabrication causes the coated film crazing and peeling.

In order to solve the aforementioned problems, there have been made in the art various proposals such as a process in which a coating composition containing a polymer resin capable of improving fabricating properties is coated on a metal plate as a substrate material, development of a coating composition capable of providing a coated film with plasticity without causing deterioration in film performances, etc.

As a matter of fact, the process according to the first proposal as above has such drawbacks that a binder for use in the coating composition is hardly dissolved in a solvent because of high molecular weight, and that increase in the rotational speed on roll coating performance results in unevenness in coating, for example, stringing and flashing, and is difficult to be put practical use.

On the other hand, the coating composition according to the second proposal as above raises such problems that a plasticizing component is liable to remain in a cured film, and particularly that on the application of the coating composition to an inner surface of vessels for use in food and drink, the plasticizing component migrates into food to be undesirable from the standpoint of food sanitation.

SUMMARY OF THE INVENTION

It is an object of this invention to provide a coating composition for metals which is capable of overcoming the aforementioned drawbacks of the conventional coating composition for metals in fabricating and shaping properties, and which is capable of forming a film free from the aforementioned problem from the standpoint of food sanitation.

It is another object of this invention to provide a coating composition for metals which has excellent bending properties and shaping properties as well as high corrosion resistance and off-flavor and is suitably applicable to both inner and outer surfaces of the vessels for use in food and drink.

That is, the present invention provides a coating composition for metals which contains (A) a modified bisphenol type epoxy resin prepared by introducing at least one, preferably one to two of a functional group represented by the following formula:

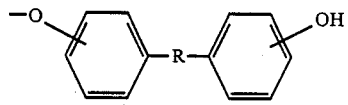

where R represents a bivalent aliphatic hydrocarbon residual group having 1 to 4 carbon atoms, into a molecular terminal of (i) a bisphenol type epoxy resin having an epoxy equivalent of 1,700 to 3,500 and a number-average molecular weight of 2,900 to 3,800, or into a molecular terminal of an esterified resin formed by esterifying (ii) a bisphenol type epoxy resin having an epoxy equivalent of 180 to 1,500 with a saturated dibasic acid and having a number-average molecular weight of 2,900 to 3,800; and (B) a phenol resin and/or an amino resin.

According to the coating composition for metals of the present invention, the modified bisphenol type epoxy resin (A) prepared by reacting between a terminal epoxy group of a specified high molecular weight epoxy resin and a bisphenol to introduce at least one, preferably one to two of the functional group represented by the formula:

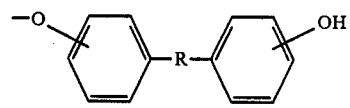

into the epoxy resin, very readily reacts with (B) the phenol resin and/or the amino resin, and moreover increase in molecular weight as the result of the reaction causes no deterioration in film performances such as hardness and adherence, resulting in obtaining a coating composition having excellent fabricating properties in bending and shaping properties.

The coating composition of the present invention is characterized by that it has good roll coating performance because of its relatively low viscosity and that it shows neither foaming nor sagging during heat-curing even if it is formed into a thick film in the order of 30 to 50μ.

Moreover, the coating composition of the present invention, on the application to the coating of the vessels for use in food and drink, shows excellent performance in acid resistance and off-flavor tests for the contents of the vessels, resulting in being suitable as a coating composition applicable to both inner and outer surfaces of the food can.

The aforementioned characteristics of the present invention can be realized only by using the specified epoxy resin having the aforementioned epoxy equivalent and the aforementioned number-average molecular weight, and by introducing the aforementioned functional group into the molecular terminal of the epoxy resin to prepare the modified epoxy resin for use. Use of any epoxy resin other than those of the present invention is not to result in obtaining any coating composition having such excellent fabricating properties and corrosion resistance as in the coating composition of the present invention.

DETAILED DESCRIPTION OF THE INVENTION

The metal substrate, on which the coating composition of the present invention is coated, may include various kinds of conventionally used metal sheets such as mild steel sheet, aluminium sheet, galvanized steel, tinplate, chrome-plated steel, nickel-plated steel and the like.

The modified bisphenol type epoxy resin (A) used in the present invention may be prepared by the following processes.

Preparation Process I of Modified Bisphenol Type Epoxy Resin (A)

A bisphenol type epoxy resin (i) having an epoxy equivalent of 1,700 to 3,500 and a number-average molecular weight of 2,900 to 3,800 is reacted directly with a bisphenol. The reaction may readily be carried out normally at 130° to 200° C. Since it is necessary for the bisphenol residual group to remain at a molecular terminal of the reaction product, a ratio of an amount of the epoxy resin to that of the bisphenol in the reaction should be such that the amount of the phenolic hydroxyl group in the bisphenol is in the range of from 1 to 2 moles, preferably 1.1 to 1.4 moles per one mole of the epoxy group in the epoxy resin.

Examples of the aforementioned epoxy resin on the market include Epikote 1007, trade name, marketed by Shell Chemical Co., Ltd. (epoxy equivalent: about 1,700; number-average molecular weight: about 2,900), Epikote 1009, trade name, marketed by Shell Chemical Co., Ltd. (epoxy equivalent: 3,500; number-average molecular weight: about 3,750), Epiclon 7055, trade name, marketed by Dainippon Ink and Chemicals, Inc. (epoxy equivalent: 1,800; number-average molecular weight: about 2,900), and the like.

The aforementioned bisphenol used in the present invention includes those represented by the following formula:

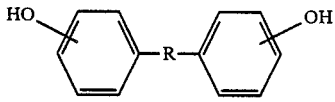

where R represents a bivalent aliphatic hydrocarbon residual group, and specifically includes bis(4-hydroxyphenyl)-2,2-propane (bisphenol A), bis(4-hydroxyphenyl)methane (bisphenol F), bis(4-hydroxyphenyl)-1,1-ethane, bis(4-hydroxyphenyl)-1,1-isobutane, and the like, bisphenol A being the most preferred.

Preparation Process II of Modified Bisphenol Type Epoxy Resin (A):

A bisphenol type epoxy resin (ii) having an epoxy equivalent of 180 to 1,500 is esterified with a saturated dibasic acid so as to form an epoxy group-containing esterified resin having a number-average molecular weight of 2,900 to 3,800, and the resulting esterified resin is reacted directly with a bisphenol.

Examples of the aforementioned epoxy resin on the market may include Epikote 815, trade name, marketed by Shell Chemical Co., Ltd. (epoxy equivalent: about 190; number-average molecular weight: about 380), Epikote 1001, trade name, marketed by Shell Chemical Co., Ltd. (epoxy equivalent: about 475; number-average molecular weight: about 900), Epikote 1004, trade name, marketed by Shell Chemical Co., Ltd. (epoxy equivalent: about 950; number-average molecular weight: about 1,400), Epiclon 850, trade name, marketed by Dainippon Ink and Chemicals, Inc. (epoxy equivalent: 190; number-average molecular weight: 380) and the like.

The saturated dibasic acid to be reacted with the aforementioned epoxy resin preferably includes those represented by the general formula:

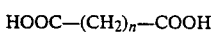

where n is an integer of 1 to 12, and specifically includes, for example, succinic acid, adipic acid, pimelic acid, azelaic acid, sebacic acid, dodecanoic acid, brassylic acid, dimer acid, and the like.

The reaction of the aforementioned epoxy resin with the saturated dibasic acid may easily be carried out according to known processes, for example, at 50° to 200° C. by use of an esterification catalyst.

A stoichiometric excess of the aforementioned epoxy resin is used for the reaction with the saturated dibasic acid, because it is necessary for the epoxy group to remain in the reaction product. Specifically, the aforementioned epoxy resin is used in such an amount that the epoxy group of the aforementioned epoxy resin is in the range of from 1.0 to 2.0 moles, preferably 1.2 to 2.0 moles per one mole of carboxyl group of the saturated dibasic acid.

The resulting epoxy group-containing esterified resin is reacted with a bisphenol similarly to the aforementioned preparation process I to prepare the modified bisphenol type epoxy eesin (A).

The phenol resin is (B) a phenol resin and/or an amino resin of the coating composition of the present invention may include the conventionally known resol type phenol resin which is prepared by reacting phenol with formaldehyde in the presence of a basic catalyst, and the amino resin therein may include, for example, known melamine-formaldehyde resin and derivatives thereof, ureaformaldehyde resin, guanamine-formaldehyde resin, and the like.

The aforementioned phenol resin and amino resin may be used alone or in combination respectively.

The ratio to be used of the component (A), that is, the modified bisphenol type epoxy resin, to the component (B), that is, the phenol resin and/or the amino resin, is such that the component (A), is generally in the range of 50 to 95 parts by weight, preferably 70 to 90 parts by weight, and the component (B) is generally in the range of 50 to 5 parts by weight, preferably 30 to 10 parts by weight. In case the aforementioned ratio is outside the aforementioned ranges, the intended object of the present invention can not be achieved because of resulting poor shaping properties and fabricating properties.

The coating composition of the present invention contains the aforementioned components (A) and (B) as the essential component, but may contain the conventional bisphenol-epichlorohydrin epoxy resin in combination with the essential components, and may also contain other conventionally used components for the coating composition such as additives, anti-corrosive pigments, color pigments, extender pigments, and the like.

The organic solvent to be used includes any solvents conventionally used for epoxy resin such as glycol solvents, alcohol solvents, ester solvents, ketone solvents, aromatic solvents and the like.

The present invention will be further explained in detail by the following Examples and Comparative Examples.

EXAMPLE 1

To a flask equipped with a stirring device, a thermometer and a condenser are charged 587 parts by weight of an epoxy resin marketed by Shell Chemical Co., Ltd. under the trade name of Epikote 1009 and having an epoxy equivalent of 2,790, 26 parts by weight of bisphenol A and 513 parts by weight of 3-methoxybutylacetate. The mixture is kept at 130° C. with stirring. About 12 hours after, the epoxy value is reduced to 0.004. Thereafter, 377 parts by weight of methyl isobutyl ketone is added to obtain a modified epoxy resin having a concentration of 40% by weight.

On the other hand, 80 parts by weight of the modified epoxy resin is mixed with 16 parts by weight of phenol resin marketed by Hitachi Chemical Co., Ltd. under the trade name of 50% Hitanol 4020, and the resulting mixture is diluted with a mixed solvent of Cellosolve acetate: solvesso 100, that is, trade name of aromatic petroleum derivatives marketed by Maruzen Oil Co., Ltd. to prepare a coating composition having a concentration of 35% by weight.

EXAMPLE 2

To a flask are charged 389 parts by weight of an epoxy resin marketed by Shell Chemical Co., Ltd. under the trade name of Epikote 828 and having an epoxy equivalent of 188 and 60 parts by weight of adipic acid. The resulting mixture is reacted at 120° C. by use of a basic catalyst until the acid value of the resin is reduced to zero (0). Thereafter, 201 parts by weight of bisphenol A and 163 parts by weight of 3-methoxybutylacetate are added and maintained at 130° C. About 8 hours after, the epoxy value is reduced to 0.0038. Thereafter, 422 parts by weight of 3-methoxybutylacetate and 390 parts by weight of methyl isobutyl ketone are added to prepare a modified epoxy resin having a concentration of 40% by weight. To 80 parts by weight of the resulting modified epoxy resin are added for mixing 8 parts by weight of the phenol resin used in Example 1 and 7 parts by weight of a urea resin marketed by Dainippon Ink and Chemicals, Inc. under the trade name of 60% Beckamine P-196, and the resulting mixture is diluted with the solvent used in Example 1 to prepare a coating composition having a concentration of 35% by weight.

EXAMPLE 3

To a flask are charged 391 parts by weight of an epoxy resin marketed by Shell Chemical Co., Ltd. under the trade name of Epikote 1001 and having an epoxy equivalent of 465, 235 parts by weight of dimer acid, 24 parts by weight of bisphenol A and 433 parts by weight of 3-methoxybutylacetate. The resulting mixture is reacted at 130° C. by use of a basic catalyst. About 12 hours after, the epoxy value is reduced to 0.004.

Thereafter, 152 parts by weight of 3-methoxybutylacetate and 390 parts by weight of methyl isobutyl ketone are added to prepare a modified epoxy resin having a concentration of 40% by weight. To 80 parts by weight of the resulting modified epoxy resin are added for mixing in the same manner as in Example 2 the same phenol resin and urea resin as in Example 2 to prepare a coating composition having a concentration of 35% by weight.

COMPARATIVE EXAMPLE 1

To 60 parts by weight of the epoxy resin marketed by Shell Chemical, Co., Ltd. under the trade name of Epikote 1007 is added for mixing 40 parts by weight of phenol resin used in Example 1 to prepare a coating composition having a concentration of 35% by weight in the same manner as in Example 1.

COMPARATIVE EXAMPLE 2

To 80 parts by weight of the epoxy resin marketed by Shell Chemical, Co., Ltd. under the trade name of Epikote 1009 is added for mixing 20 parts by weight of urea resin used in Example 2 to prepare a coating composition having a concentration of 35% by weight in the same manner as in Example 2.

COMPARATIVE EXAMPLE 3

In the same manner as in Example 2, 34 parts by weight of the epoxy resin marketed by Shell Chemical, Co., Ltd. under the trade name of Epikote 1009, 20 parts by weight of phenol resin used in Example 1 and 10 parts by weight of urea resin used in Example 2 are mixed to prepare a coating composition having a concentration of 35% by weight in the same manner as in Example 2.

The coating compositions obtained according to Examples 1–3 and Comparative Examples 1–3 are sprayed on a 0.23 mm tinplate marketed by Nippon Steel Corporation to a thickness of about 40μ, and heat-cured at 220° C. for 90 seconds respectively.

The results of the tests for the physical properties of the resulting coated films are shown in the following Table 1.

Test Items

Adherence

The coated film is cut so as to reach the substrate with a razor at intervals of 1 mm to form 100 squares, to which an adhesive cellophane tape is attached and then pull off. The resulting stripped area of the squares are evaluated according to three grades, that is, grade 1:0%; grade 2:1to 10%; and grade 3:11 to 20%. Du Pont Impact Test:

A load having a diameter of ⅜ inch and a weight of 500 g is dropped on the coated film to be tested from a height of 30 cm. The results are evaluated according to 4 grades, that is, grade 1: no cracks are formed; grade 2: cracks are partly formed; grade 3: cracks are formed all over the coated film to be tested; grade 4: cracks are formed all over the coated film to be tested and the coated film is partly stripped. Beading Resistance:

It is evaluated according to 4 grades, that is, grade 1: no cracks are formed; grade 2: cracks are partly formed; grade 3: cracks are formed over most of the coated film to be tested; grade 4: cracks are formed all over the coated film to be tested.

Bending test

A test sample is bended at an angle of 180° so that a 0.2±0.01 mm metal sheet may be put therebetween, and the bended portion is immersed in a copper sulfate solution for evaluating in accordance with 4 grades, that is, grade 1: no cracks are formed; grade 2: cracks are partly formed; grade 3: cracks are formed all over the coated film to be tested; grade 4: cracks are formed all over the coated film to be tested and the coated film is partly stripped.

TABLE 1

|  | Adher-ence | Du Pont Impact test | Flanging test | Beading Resistance | Bending test |
|---|---|---|---|---|---|
| Example 1 | 2 | 2 | slightly stripped | 2 | 2 |
| Example 2 | 1 | 1 | no stripping | 1 | 1 |
| Example 3 | 1 | 1 | no stripping | 1 | 1 |
| Comparative Example 1 | 2-1 | 3 | slightly stripped | 3 | 4-3 |
| Comparative Example 2 | 2 | 4-3 | stripped | 4-3 | 4 |
| Comparative Example 3 | 2 | 4-3 | stripped | 4-3 | 4 |

What is claimed is:

1. A coating composition for metals which contains: (A) a modified bisphenol-based epoxy resin prepared by introducing at least one of a functional group represented by the following formula:

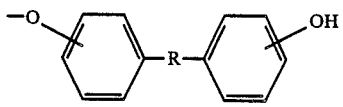

wherein R represents a bivalent aliphatic hydrocarbon residual group having 1 to 4 carbon atoms into a molecular terminal of an esterified resin formed by esterifying a stoichiometric excess of a bisphenol-based epoxy resin having an epoxy equivalent of 180 to 1,500 with a saturated dibasic acid and having a number-average molecular weight of 2,900 to 3,800; and (B) a phenol resin and/or an amino resin.

2. The coating composition as claimed in claim 1 wherein said coating composition comprises 50 to 95 parts by weight of (A) the modified bisphenol-based epoxy resin and 50 to 5 parts by weight of (B) the phenol resin and/or the amino resin.

3. The coating composition as claimed in claim 1 wherein said coating composition comprises 70 to 90 parts by weight of (A) the modified bisphenol-based epoxy resin and 30 to 10 parts by weight of (B) the phenol resin and/or the amino resin.

4. The coating composition as claimed the claim 1 wherein one to two of the functional group is introduced.

5. The coating composition as claimed in claim 1 wherein (A) the modified bisphenol-based epoxy resin is prepared by a process which comprises esterifying the bisphenol-based epoxy resin with the saturated dibasic acid to form the esterified resin under the condition of a stoichiometric excess of the epoxy resin, and reacting the esterified resin directly with a bisphenol under the conditions that the amount of the phenolic hydroxyl group in the bisphenol is in the range of from 1 to 2 moles per mole of the epoxy group in the esterified resin.

6. The coating composition as claimed in claim 5 wherein the epoxy resin is used in such an amount that the epoxy group of the epoxy resin is in the range of from 1.0 to 2.0 moles per one mole of carboxyl group of the saturated dibasic acid.

7. The coating composition as claimed in claim 6 wherein the epoxy group of the epoxy resin is in the range of from 1.2 to 2.0 moles per one mole of carboxyl group of the saturated dibasic acid.

8. The coating composition as claimed in claim 5 wherein the amount of the phenolic hydroxyl group in the bisphenol is in the range of from 1.1 to 1.4 moles per mole of the epoxy group in the esterified resin.

9. The coating composition as claimed in claim 5 wherein the bisphenol is selected from bis(4-hydroxyphenyl)-2,2-propane (bisphenol A), bis(4-hydroxyphenyl)methane (bisphenol F), bis(4-hydroxphenyl)-1,1-ethane, and bis(4-hydroxyphenyl)-1,1-isobutane.

10. The coating composition as claimed in claim 5 wherein the bisphenol is bisphenol A.

11. The coating composition as claimed in claim 1 wherein the saturated dibasic acid is selected from succinic acid, adipic acid, pimelic acid, azelaic acid, sebacic acid, dodecanoic acid, brassylic acid and dimer acid.

* * * * *